United States Patent [19]
Wicki

[11] Patent Number: 5,509,038
[45] Date of Patent: Apr. 16, 1996

[54] MULTI-PATH DATA SYNCHRONIZER SYSTEM AND METHOD

[75] Inventor: Thomas M. Wicki, Palo Alto, Calif.

[73] Assignee: Hal Computer Systems, Inc., Campbell, Calif.

[21] Appl. No.: 223,575

[22] Filed: Apr. 6, 1994

[51] Int. Cl.[6] .............................. H04L 7/00; H04L 25/36; H04L 25/40

[52] U.S. Cl. .............................. 375/371; 370/108; 371/1; 375/375

[58] Field of Search .................................. 371/1; 370/108, 370/103; 375/354, 356, 373, 376, 368, 375

[56] References Cited

U.S. PATENT DOCUMENTS

| | | | |
|---|---|---|---|
| 4,573,173 | 2/1986 | Yoshida | 370/108 X |
| 4,890,303 | 12/1989 | Bader | 370/103 X |
| 5,022,056 | 6/1991 | Henderson et al. | 370/108 X |

*Primary Examiner*—Stephen Chin
*Assistant Examiner*—Bryan E. Webster
*Attorney, Agent, or Firm*—Albert C. Smith

[57] ABSTRACT

A system and method for transferring data between clock domains operating at substantially the same frequency continuously compares the phase relationship of the clocks of the two domains and retains the current state of comparison at the start of a transfer of a block or frame of data for determining along which one of multiple data paths within the synchronizing circuit the transfer of the data frame will take place. Several data paths with different delays (at least two) transfer the data frame and clock signals. A phase comparator responds to the phase relationship between clocks attaining a value within one or another range of values at the start of a data frame to determine which one of the multiple data paths transfers the data frame.

7 Claims, 3 Drawing Sheets

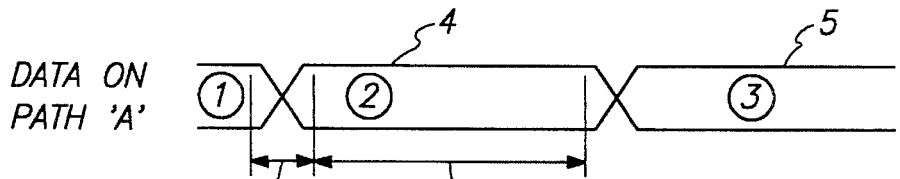
FIG. 1A DATA ON PATH 'A'
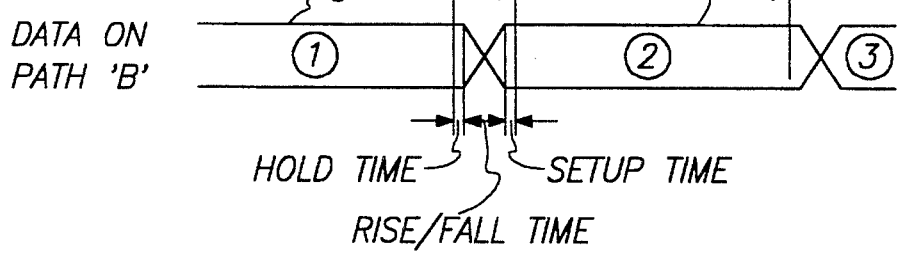
FIG. 1B DATA ON PATH 'B'
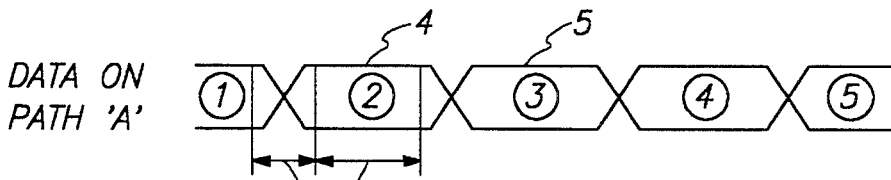
FIG. 1C DATA ON PATH 'A'
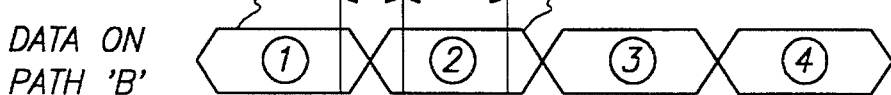
FIG. 1D DATA ON PATH 'B'

MULTI-PATH DATA SYNCHRONIZER SYSTEM AND METHOD

FIELD OF INVENTION

This invention relates to techniques for transferring data in blocks or packets or frames between clock domains operating at nominally the same clock frequencies at high data transfer rates and with low latency or delay.

BACKGROUND OF THE INVENTION

Large computer systems commonly require clock signals to be distributed over long distances. This constitutes a significant engineering problem for clock signals at very high frequencies for which variations in propagation delays attributable, for example, to variations in the length of a clock signal conductor, can introduce skews in clocked events occurring at distant locations in the computer system.

One common technique to reducing clock skews in large computer systems is to introduce multiple clocks operating in separate clock domains of the system at substantially the same frequency. However, data which is transferred between separate clock domains requires synchronization with the clock in the receiving domain to preserve the clock-oriented integrity of the transferred data. Synchronization circuits for this purpose commonly involve phase-locked loops which link the sending and receiving clock domains to avoid latency or delays in transferring data between such domains. However, such phase-locked loops typically require incorporation of the clock oscillator within a feedback loop which frequently is not conveniently possible. In addition, phase-locked loops commonly operate at undesirably high levels of power dissipation. More importantly, where such clock domains communicate with several other clock domains, it is typically not possible to identify one clock to which all clock domains will synchronize.

Another conventional technique for synchronizing the transfer of data between clock domains uses a dual-port memory unit such as a first-in, first-out (FIFO) buffer which can be written to and read from at different time intervals, and at different frequencies. One disadvantage of such techniques is the latency or delay that is introduced into the communication of data between clock domains. In such techniques, the data (typically in a block or a frame) must be written or stored in the memory unit. A control signal typically must be propagated from the transmitting to the receiving domain to enable the read of data from the memory unit to the receiving domain.

SUMMARY OF THE INVENTION

In accordance with the illustrated embodiment of the present invention, a direct data path and one or more alternate delayed data paths are provided between communicating clock domains to transfer data in the phase relationships between domain clocks around a limited window of time intervals within which logic circuits in the receiving clock domain are able to latch data in synchronism with the clock of the transmitting domain. Control and data signals are transferred to the receiving domain along separate conductors of common lengths to assure low latency in data transfers. The direct path communicates data for one range of phase relationships between the clocks of the communicating domains, and the alternative delay paths communicate the data for other ranges of phase relationships. The transition between data paths ideally occurs during gaps or intervals between successive frames of data being transmitted in order to avoid possible losses of data that might result from switching data paths during transfer of a data frame. Phase detection circuitry automatically detects the phase relationship between communicating domains and determines which path implements the communication of one more more successive data frames between clocked domains. In the event a succession of data frames are transferred between clocked domains without a gap or interval occurring within a period of about one half cycle of the beat frequency or difference frequency between the domain clocks, then transmission of a successive data frame may be delayed in conventional manner for one or more cycles of the transmitter (or receiver) clock to assure proper time for switching between data paths in the delay interval.

DESCRIPTION OF THE DRAWINGS

FIGS. 1(a), (b), (c) and (d) are graphs illustrating clocked data intervals;

DESCRIPTION OF THE PREFERRED EMBODIMENT

Referring now to FIGS. 1(a) and 1(b), there is shown a simplified sequence of different clock-oriented data words being transferred from a data transmitter to a data receiver along two data paths, A and B. The "safe" designation means that a clock transition (i.e. data associated with one clock domain is transferred to another clock domain) occurring in this interval results in correct latching of the data, and the "critical" designation means that a clock transition occurring in this interval might result in corrupted data due to transients and violations of operating requirements of logic circuits involved. Each of the intervals 4–7 are shown representing the envelope of valid data words being transferred on n-bit wide data buses of path 'A' and path 'B' between a data transmitter in one clock domain and a data receiver in another clock domain. As illustrated, the 'safe' interval on path 'B' is delayed sufficiently to completely overlap the critical interval on path 'A', and vice versa. The 'critical' interval, including the rise or fall times of data signals and the set up and hold times of the logic circuits, essentially depends upon the technology involved, and at least the 'safe' interval decreases with increasing frequency, as illustrated in FIGS. 1(c) and 1(d). Where the 'safe' interval becomes too small at higher clock frequencies to overlap the 'critical' interval, additional paths may be needed, where the phase shifts of data transferred along two neighboring paths (ex. A and B) is:

$$360°/n \qquad \text{(Eq. 1)}$$

where n=number of total paths, and additional phase shifts of neighbor-paths (Ex. at 0°, 90°, 180° and 270° for n=4) may be appropriate.

Figure 2:
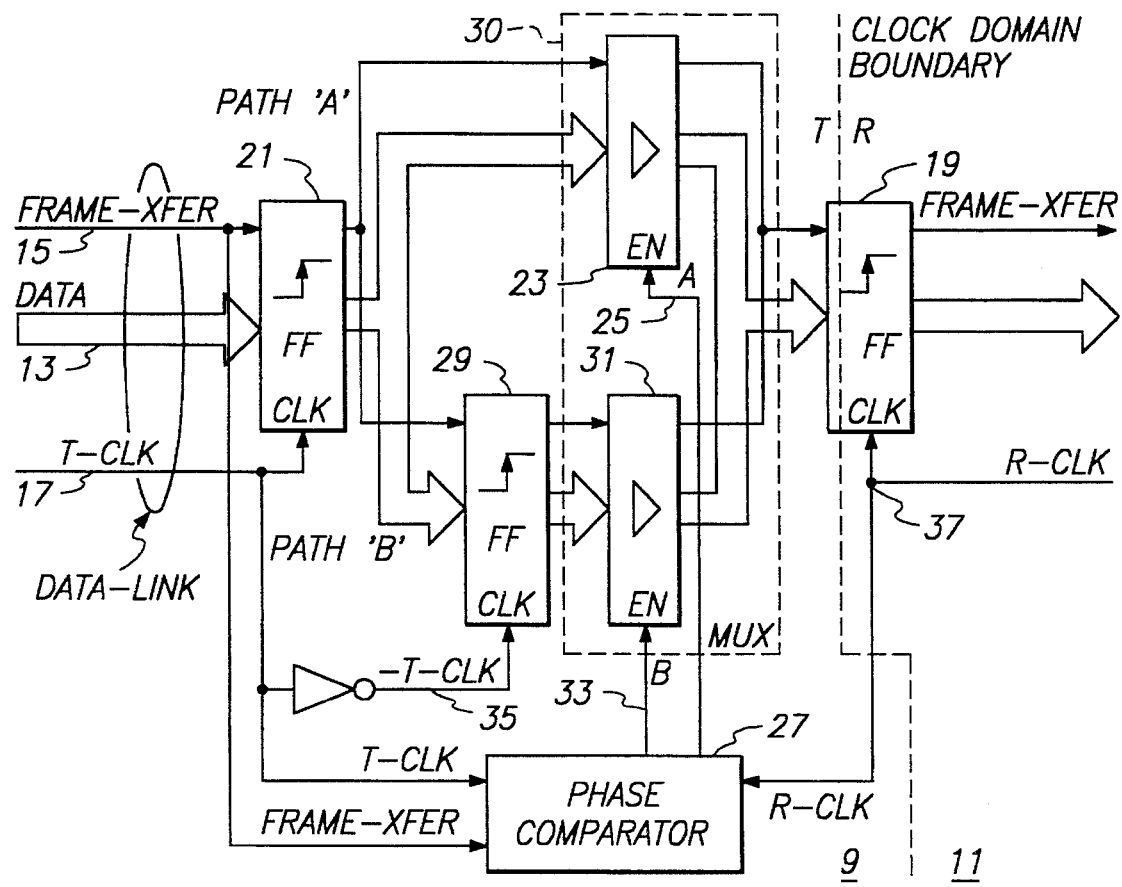
FIG. 2 is a block schematic diagram of a data synchronizer according to the illustrated embodiment of the present invention.

Data words are typically transferred between clock domains as n bits along n parallel conductors, and are transferred with associated clock signals. Thus, as illustrated in the embodiment of FIG. 2, there is shown a block schematic diagram of a data synchronizer including two data paths between a transmitting clock domain 9 and a receiving clock domain 11. The data 13 to be transmitted to the receiving domain 11 occurs in data packets or blocks commonly referred to as frames, and is associated with a Frame Transfer (frame-xfer) signal 15 and the accompanying clock signal 17 from the clock (not shown) of the transmitting domain 9. The transmitter clock T-clk and the receiver clock R-clk are independent clock oscillators with nominally the same clock frequencies. The data synchronizer of the present invention resides in the transmitting clock domain, although it resides at the distal end of the data link adjacent the receiving domain. The synchronizer operates on the basis that data logic circuits such as a flip flop or register 19 in the next stage (i.e., in the receiving domain 11) will be capable of latching data for a fraction, α, of the clock period (e.g., up to one-half clock period). The time interval, or window (i.e., the critical "window"), within which direct data latching is not possible or is unreliable is a relatively short interval, as illustrated in FIGS. 1(a)–1(d). Of course, data signals in a clock domain can have a constant phase-shifted relationship to the clock-oscillator of the domain. And, since the data and clock signals are transferred on parallel wires of common lengths, these signals maintain their relative timing (with only a possibility of relatively small skew) as transferred to the receiving domain.

Accordingly, the data frame to be communicated from the transmitting domain 9 to the receiving domain 11 passes in conventional manner at clocked intervals through the register 21 along one of two (or more) paths with different delays to the register 19 of the receiving domain 11. The first path A includes a gate 23 that is enabled in response to an enabling signal 25 applied thereto by the phase comparator 27, as later described herein. The second path B includes a register 29 and a gate 31, where the gate 31 is enabled in response to an enabling signal 33 applied thereto by the phase comparator 27, and the register 29 is clocked 35 at alternate half cycles (i.e., inverted or 180°-shifted for a two-path synchronizer) of the clock of the transmitting domain 9. Gates 23 and 31 may be considered to comprise alternate transmission branches of a multiplexer 30. The frame-xfer signal 15 is coupled to and through all registers 21, 29, 19 and gates 23, 31 and is also supplied to the phase comparator 27. The phase comparator 27 also receives clock signals 17, 37 both from the clock of the transmitting domain 9 and from the clock of the receiving domain 11.

In operation, the time interval within which direct data latching in response to applied clock signals is not possible, or is unreliable, is relatively small, and the overlap between the two paths A and B (i.e., the two windows within which both paths work well and reliably) is relatively large. The switch over from one to another of the paths is therefore typically not critical. However, for circuit technology that is used in the domains 9 and 11, if the phase window or time interval within which direct data latching is not possible, or is unreliable, is relatively large, then four or more paths may be used to assure proper data synchronization via incrementally-delayed transfer paths controlled by fractionally-delayed clock signals in such multiple paths. Ideally, at least two switches occur between one data path and another data path per cycle of the beat or difference frequency (between the clock frequencies of the two clocked domains), and such switches between data paths occur in intervals or gaps between successive data frames being transmitted between the clocked domains.

As a basic assumption, the unit of data transmitted between clock domains 9,11 is a frame or block of data that requires only a small number of cycles. The clocks of nominally same frequency may only drift relatively slightly during a frame transfer, and it is therefore not necessary to switch paths within the interval of a frame transmission. The decision regarding which transmission path to use for a frame transfer is therefore only made once per transmitted frame just before the transfer starts. As illustrated in FIG. 2, the decision regarding which path A or B to use is determined only once for each frame of data. The clocks of the transmitting and receiving domains 9, 11 typically are stable to within about 50 parts per million and, therefore are not expected to drift apart significantly in frequencies during a frame transfer, and the clock signals are expected to retain approximately 50% duty cycles. While the frame-xfer signal 15 is inactive, the phase shift between the two clocks of the transmitter and receiver domains are tracked. Then, when the frame-xfer signal 15 occurs, (and stays active during the entire transfer of the frame) the current state is fixed for the duration of the transfer of the frame of data. Thus, if the phase relationship of the two domain clocks is between about 90° and 270° at the occurrence of a frame-xfer signal 15, path A is activated by enabling the gate 23 to pass the data frame 13 through register 21 and gate 23 to the receiving register 19. Alternatively, if the phase relationship between the two domain clocks at the occurrence of a frame-xfer signal 15 is between about –90° and 90°, path B is activated by enabling the gate 31 to pass the data frame 13 through registers 21 and 29, and through the gate 31 to the receiving register 19. In this path B, the data is first latched in register 29 with the inverted or 180°-shifted transmitter clock 35 and in this manner is suitably delayed to allow synchronization with the clock of the receiving domain 11 in the receiving register 19. The resulting selection between path A and path B includes substantial overlap as illustrated in FIGS. 1(a)–1(b), to assure that the switching between the paths will not be critical and data will transfer adequately well for any given phase relationship of the clocks of the two domains. Narrow windows with phase relationship between the two clocks and occurring about 0° and 180° are overcome by selecting path A to transfer data for phase relationships between about 90° and 270°, and by selecting path B to transfer data for phase relationships between about –90° and 90°. In addition, on a cable of conductors of common lengths for transferring data and clock signals, the clock is delayed by substantially the same amount of time that the data is delayed in the transfer along the same lengths of conductors. This assures that the phase relationship is preserved between the data being transferred and the clock of the transmitting domain in each data transfer.

Figure 3:
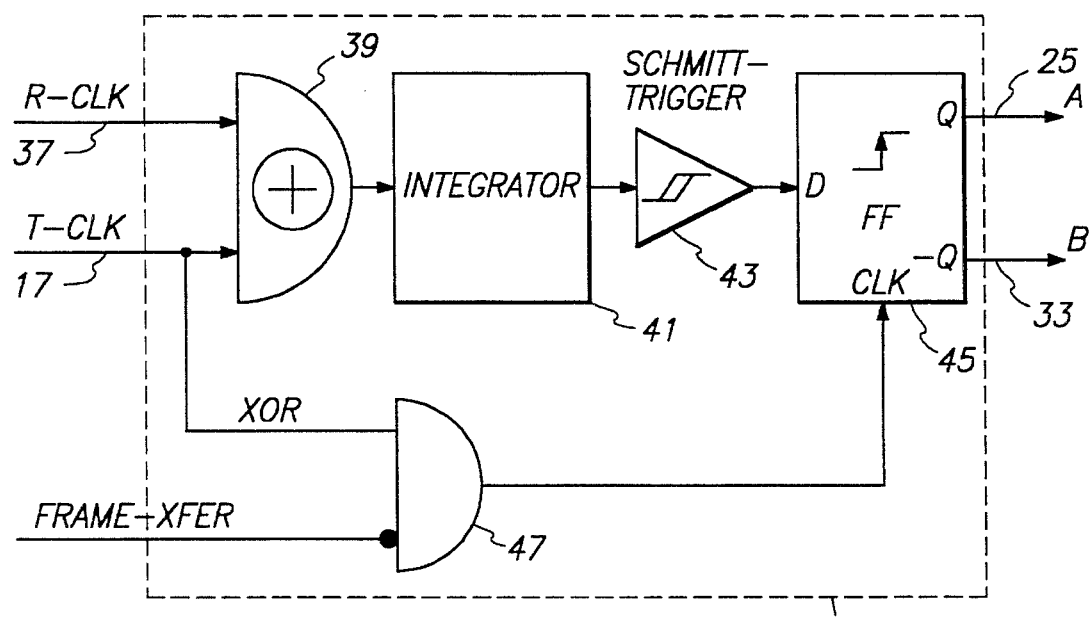
FIG. 3 is a schematic diagram of a phase comparator for operation in the circuit of FIG. 1.

Referring now to FIG. 3, there is shown a schematic diagram of the phase comparator 27 including an Exclusive-OR (XOR) gate 39 that is connected to receive the clock signals 17, 37 from both domains. The output of the Exclusive-OR gate 39 (typically, a square wave of non-50% duty cycle) is applied through an integrator 41 to a Schmitt-trigger circuit 43 that introduces hysteresis to the analog input signal between logic '1' and logic '0' levels. The resulting output level from the Schmitt-trigger 43 is applied to the input of a D-type flip flop 45 which also receives a clocking pulse from the output of AND gate 47 which receives both the frame-xfer signal and the clock signal 17 from the transmitting domain. The resulting output 25 of D-flip flop 45 enables the gate 23 in path A, and the inverted output 33 enables the gate 31 in path B. In an alternative embodiment, the phase comparator 27 may include two or more D-type flip flops each coupled with the non-inverting output to a succeeding input, and with the clock inputs connected to receive the clock signal of the domain in which the phase comparator 27 resides. This arrangement of D-type flip flops helps to reduce the uncertainty in the switching between data paths, as later described herein, with substantial exponential improvement in performance for an increase in the number (at least two) of D-type flip flps involved. And, such arrangements of D-type flip flops in the comparator circuit 27 do not significantly affect data transfers since the comparator circuit 27 is in the control path responsive to the relatively slow variations in the beat frequency, or difference between clocks in the transmitting and receiving domains. Although the comparator circuit 27 is described herein as being within the transmitting domain, it should be noted that the comparator circuit 27 may also be arranged in the receiving domain with the frame-xfer signal applied to the AND gate 47 from the frame-xfer output of the latch 19 in the receiving clock domain 11, as shown in FIG. 2, and with the clock 37 of the receiving domain also applied to the AND gate 47.

Figure 4:
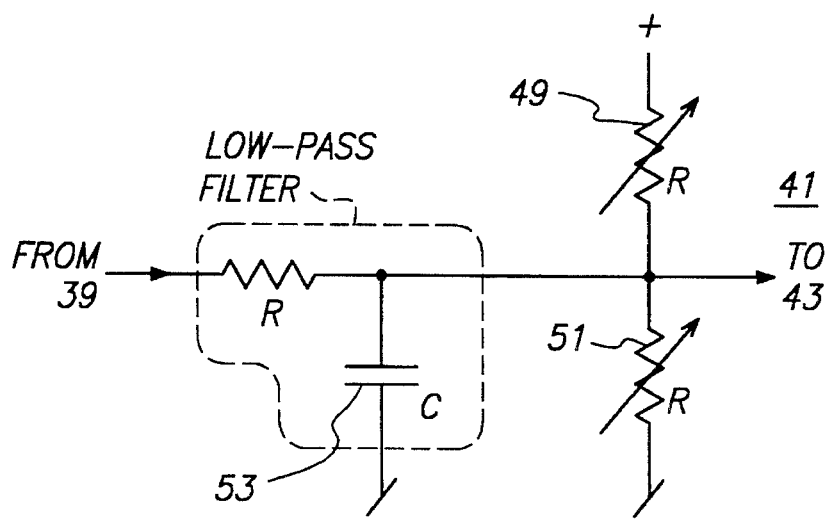
FIG. 4 is a schematic diagram of an integrator for operation in the circuit of FIG. 1.

Referring now to FIG. 4, there is shown a schematic diagram of an integrator for operation in the phase comparator of FIG. 3. Specifically, the voltage across capacitor 53 operates between high and low logic values, and is pre-charged to a voltage value between such logic values by the resistors 49 and 51 which are serially connected between a voltage supply and a reference potential. For operation in phase comparator circuitry of FIG. 3, the resistors 49,51 can be adjusted slightly to "tune" the integrator by adjusting the pre-charge voltage on the capacitor 53 to compensate for less than symmetrical clock signals (i.e., less or more than 50% duty cycle).

Figure 5A:
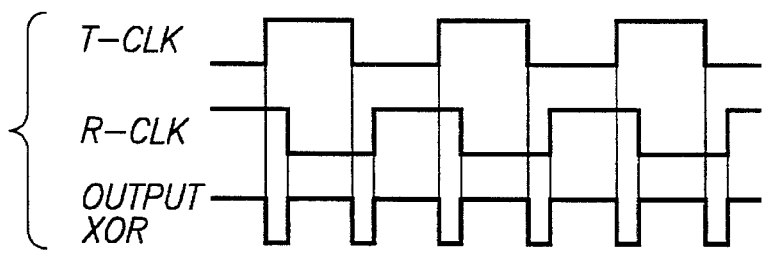
FIGS. 5(a)–(c) are charts illustrating selected waveforms in the operation of the circuit of FIG. 1.
Figure 5B:
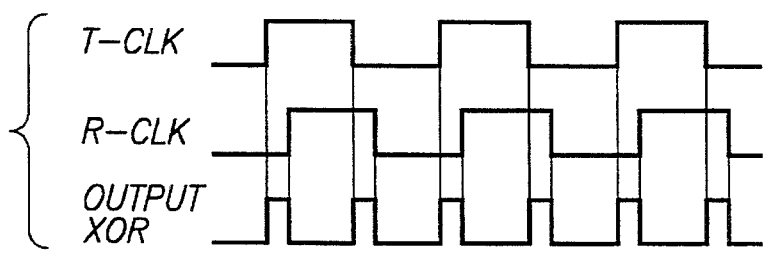
Figure 5C:
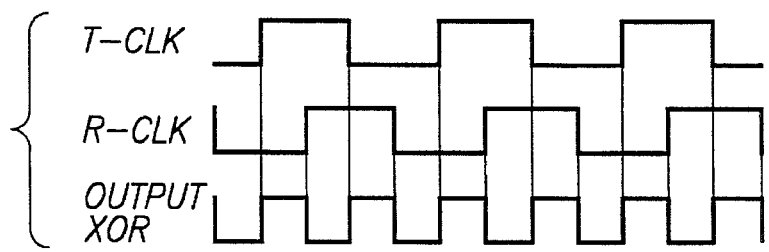

Referring now to the graphs of FIGS. 5(*a*)–(*c*), there are shown selected waveforms during operation of the circuit of FIG. 2. Specifically, FIG. 5(*a*) indicates that where the phase relationship between clocks approaches 180°, the output of the XOR gate 39 has greater than 50% duty cycle, and this output therefore integrates toward a high logic level. As illustrated in FIG. 5(*b*), where the phase relationship between clocks approaches 0°, the output of the XOR gate 39 has less than 50% duty cycle, and this output therefore integrates toward the low logic value. As illustrated in FIG. 5(*c*), where the phase relationship between clocks is 90° or 270°, the output of the XOR gate 39 has approximately 50% duty cycle and this output therefore integrates toward a level between high and low logic values. In these operating conditions, the output of the integrator at a level between high and low values is not a logic level, and the hysteresis about the mid-level provided by the Schmitt trigger 43 inhibits switching when neither the high logic level nor the low logic level is reached, and this removes a region of uncertainty by assuring that the D-flip flop 45 will be triggered to switch path A or B for a data transfer therethrough, only on distinct logic levels from the XOR gate 39. And, since such operating region of uncertainty occurs for clock phase relationships around −90° and 90°, it does not matter which path A or B is used for the data transfer since either path will transfer data adequately well, as previously described with reference to FIGS. 1(*a*)–(*d*) and 2. In this way, the data synchronizer introduces only small delay or latency in transferred data within the limits of between about α and 1+α clock cycles, which is typically smaller than the delays that are commonly associated with dual-port memory units, previously discussed.

Therefore, the data synchronizer system and method of the present invention compares the phase relationship between clocks in different clock domains to determine the appropriate delay to be introduced in the transfer of data along one of a number of data paths between domains to assure receipt of the transmitted data at the receiving domain in synchronization with the associated clock. Latency is substantially reduced relative to conventional synchronization using dual-port memory buffers, and power dissipation is significantly reduced relative to conventional phase-lock loop synchronizers by using only few logic components to implement reliable data transfers between clock domains.

What is claimed is:

1. Apparatus for synchronizing the transfer of data over conductors from a transmitting unit having a first clock signal to a receiving unit having a second clock signal, where the first and second clock signals recur at substantially the same frequency, the apparatus comprising:

a plurality of data paths coupled between the conductors from the transmitting unit and the receiving unit for selectively transferring data therebetween; and a path selector coupled to the data paths for enabling one of the data paths in response to the phase difference between the first clock signal and the second clock signal attaining a selected value, wherein the path selector comprises:

a phase comparator having two outputs having a first input coupled to the first clock, a second input coupled to the second clock, a third input coupled to receive a signal indicative of the transfer of a data block, for comparing the phases of the first clock signal and the second clock signal; and a multiplexer coupled to receive the data to be transferred on the data paths to the receiving unit, and having enable inputs coupled to the outputs of the phase comparator for selectively transmitting the data along the direct data path or the alternate data path in response to an output from the phase comparator.

2. The apparatus according to claim 1 wherein the phase comparator comprises:

an XOR gate having a first input coupled to the first clock signal, a second input coupled to the second clock signal, and having an output;

an integrator having an input coupled to the output of the XOR gate and having an output;

a Schmitt-trigger having an input coupled to the output of the integrator and having an output;

an AND gate having one input coupled to receive the first clock signal and another input coupled to receive the inverse of said signal indicative of the transfer of said data block for producing an output as a logical AND combination of the signals applied to the inputs thereof; and a D-type flip flop having a data input coupled to the output of the Schmitt trigger and a clock input coupled to the output of the AND gate and two outputs coupled to the multiplexer for selecting which of the data paths transfers the data.

3. The apparatus according to claim 2 wherein the integrator comprises:

a first resistor coupling the output of the integrator to a first reference voltage;

a second resistor and a capacitor coupling the output of the integrator to a second reference voltage; and a third register connecting the output of the XOR gate and the capacitor for forming therewith a low-pass filter.

4. The apparatus according to claim 1 further comprising:
a parallel data latching device having an input coupled to the output of the multiplexer to receive the transferred data, and having a clock input coupled to the second clock for passing the synchronized transferred data therethrough to the receiving unit.

5. Apparatus for synchronizing the transfer of data over conductors from a transmitting unit having a first clock signal to a receiving unit having a second clock signal, where the first and second clock signals recur at substantially the same frequency, the apparatus comprising:
a plurality of data paths coupled between the conductors from the transmitting unit and the receiving unit for selectively transferring data therebetween;
a data latching device having an input directly coupled to parallel data conductors to receive the transferred data, and having a clock input coupled to the first clock, and an output coupled to the direct and alternate ones of the data paths; and
a path selector coupled to the data paths for enabling one of the data paths in response to the phase difference between the first clock signal and the second clock signal attaining a selected value.

6. A method for synchronizing the transfer of data along a selected one of multiple data paths from a transmitting unit having a first clock signal to a receiving unit having a second clock signal where the first and second clock signals recur at substantially the same frequency, the method comprising the steps of:
comparing the phases of the first and second clock signals at a selected time prior to a data transfer; and
selecting either one of the multiple data paths or another of the multiple data paths for transfer of the data therealong in response to the current phases of the first and second clock signals attaining a value at said selected time which is within, respectively, one or another different ranges of value; wherein the step of selecting a path includes:
comparing the phases of the first and second clocks at an interval prior to the start of a transfer;
maintaining the state of the phase comparison unchanged for the duration of a transfer of a block of data; and
activating a selected data path for transferring data therealong in response to the comparison of phases of the first and second clocks.

7. The method according to claim 6 wherein the step of comparing phases includes:
Exclusive-OR logically combining the first clock signal and the second clock signal to provide a logical output signal;
integrating the logical output to provide a signal having an amplitude indicative of the phase relationship between the first and second clock signals;
AND logically combining the first clock signal and the inverse of a signal indicative of the transfer of data for producing an output as a logical AND combination of the input signals; and
triggering a selection of a data path in response to the combination of the amplitude of the signal indicative of the phase relationship attaining a selected amplitude and the logical AND output attaining a selected value.

* * * * *